United States Patent [19]
Kowalewski

[11] 3,873,904
[45] Mar. 25, 1975

[54] AUTOMATIC TURN-ON CIRCUIT FOR A DC TO DC DOWN CONVERTER

[75] Inventor: Rolf E. Kowalewski, Palatine, Ill.

[73] Assignee: Motorola, Inc., Chicago, Ill.

[22] Filed: Mar. 21, 1974

[21] Appl. No.: 453,458

[52] U.S. Cl. .................... 321/2, 321/45 S, 323/17, 323/DIG. 1
[51] Int. Cl. .......................... G05f 1/64, H02m 3/32
[58] Field of Search ....... 321/2, 18, 45 S; 323/22 T, 323/17, DIG. 1

[56] References Cited
UNITED STATES PATENTS

| | | | |
|---|---|---|---|
| 3,211,989 | 10/1965 | Mintz et al. | 323/22 T |
| 3,434,030 | 3/1969 | Bedford | 321/2 |
| 3,437,912 | 4/1969 | Morris | 323/DIG. 1 |
| 3,453,520 | 7/1969 | Mas | 321/2 |
| 3,733,540 | 5/1973 | Hawkins | 323/DIG. 1 |

OTHER PUBLICATIONS
EDN/EEE Feb. 15, 1972; "Two Switching Regulators For Battery-Powered Systems," by Billingsley et al.; pg. 40-43.

Primary Examiner—Gerald Goldberg
Attorney, Agent, or Firm—Eugene A. Parsons; Vincent J. Rauner

[57] ABSTRACT

A DC to DC down converter having a semiconductor switch connected between the input and output terminals thereof, which switch is controlled by a variable pulse generator and an automatic turn-on circuit including a voltage divider connected between the input and output terminals of said converter, switching means operable in response to a voltage across said voltage divider and controlling the application of power to the variable pulse generator, and a diode connected between the semiconductor switch and the junction of the voltage divider and output terminal to allow the converter to shutdown when the load is removed from the output terminal.

5 Claims, 2 Drawing Figures

PATENTED MAR 25 1975 3,873,904
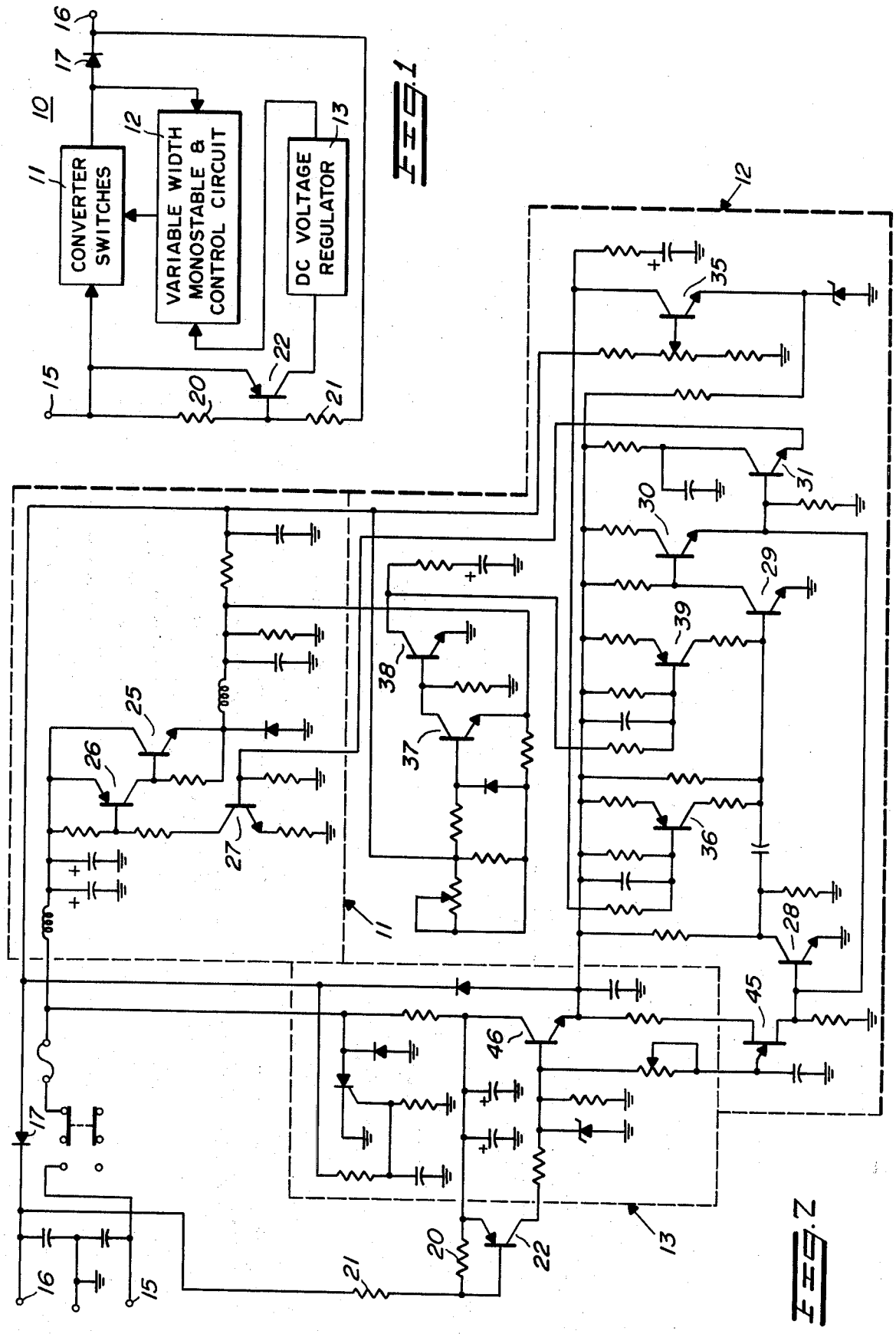

3,873,904

AUTOMATIC TURN-ON CIRCUIT FOR A DC TO DC DOWN CONVERTER

BACKGROUND OF THE INVENTION

1. Field of the Invention

The present invention is specifically adapted for use with DC to DC down converters. In many instances, such as on small boats having radios and the like, the power source of the boat must be reduced to a value usable by the radio. For this purpose a DC to DC down converter is supplied, which down converter is generally situated remotely from the radio. Since the down converter is generally situated remotely from the radio, it is extremely inconvenient to require the operation of a turn-on switch at the down converter each time it is desired to use the radio. It is, however, impractical to maintain the down converter in operation continuously.

2. Description of the Prior Art

In the prior art a DC input power line is run to place an on--off switch near the radio or other equipment supplied by the converter. Thus, the DC to DC down converter and the equipment can be turned on at the remote location.

In U.S. Pat. No. 3,453,520, entitled Low Direct Voltage To High Direct Voltage Converter, issued to J. A. Mas, a DC to DC up converter is described which includes an automatic turn-on feature. However, the automatic turn-on circuitry is an integral part of the up converter and requires substantial amounts of current for the operation thereof. Thus, large load currents are required before this prior art converter operates properly and a device such as this would be inoperative and impractical for the purposes described for the present invention.

SUMMARY OF THE INVENTION

The present invention pertains to an automatic turn-on circuit for a DC to DC down converter including voltage divider means coupled between the input and output terminals of the converter, switching means coupled to a tap of the voltage divider means for operation upon the application of a voltage across said voltage divider means and further coupled to apply power to a variable pulse generator in the down converter to cause operation of said down converter, and unidirectional current conducting means coupled between the down converter and the voltage divider means for allowing current to flow from the down converter to the voltage divider means but not in the reverse direction. When a load is connected to the output terminal of the DC to DC down converter a small current flows through the voltage divider means causing the switching means to operate and turn on the down converter. The unidirectional current conducting means allows the down converter to be shut off when the load is removed.

It is an object of the present invention to provide an automatic turn-on circuit for use in conjunction with a DC to DC down converter.

It is a further object of the present invention to provide an automatic turn-on circuit which requires minimal alterations in the DC to DC down converter and which will operate even when small loads (low current drain) are applied to the output of the down converter.

These and other objects of this invention will become apparent to those skilled in the art upon consideration of the accompanying specification, claims and drawings.

Referring to the drawings, wherein like characters indicate like parts throughout the figures;

FIG. 1 is a semiblock, semischematic illustration of a DC to DC down converter incorporating an embodiment of the present invention; and FIG. 2 is a schematic diagram of the circuitry illustrated in FIG. 1.

DESCRIPTION OF THE PREFERRED EMBODIMENT

Referring specifically to FIG. 1, the numeral 10 generally designates a DC to DC down converter including a converter switch 11, a variable width monostable and control circuit 12 and a DC voltage regulator 13. The converter 10 has an input terminal 15 coupled to an input of the converter switch 11 and an output terminal 16. The output terminal 16 is coupled through a unidirectional current conducting means, in this embodiment semiconductor diode 17, to the output of the converter switch 11. The variable width monostable and control curcuit 12 is connected to the converter switch 11 and supplies control pulses thereto to control the duration of conduction of the converter switch 11. The variable width monostable and control curcuit 12 is connected to the output of the converter switch 11 to provide a feedback circuit which controls the variable width monostable and control circuit 12. The variable width monostable and control circuit 12 is connected to the DC voltage regulator 13 and receives power therefrom. Voltage divider means, which in this embodiment is a resistor 20 and a resistor 21 connected in series, are connected between the input terminal 15 and the output terminal 16. The junction of the resistors 20 and 21 is connected to the base of a P-N-P type transistor 22, the emitter of which is connected to the input terminal 15 and the collector of which is connected to the DC voltage regulator 13.

In the operation of the circuit, when a load is connected to the output terminal 16 a relatively small current flows through the resistors 20 and 21 as well as through the emitter base junction of the transistor 22 sufficient to switch the transistor 22 into conduction. The transistor 22 is a switching transistor which is either on or off and which operates as a switch for the DC voltage regulator 13. When the transistor 22 is switched into conduction the DC voltage regulator 13 supplies voltage to the variable width monostable and control circuit 12. When voltage is supplied to the variable width monostable and control circuit 12, pulses are applied to the converter switch 11 which causes periodic conduction therein dependent upon the amount of voltage desired at the output terminal 16.

With no load applied to the output terminal 16 the diode 17 operates to prevent current from flowing through the resistors 20 and 21 into the converter switch 11, which converter switch 11 provides some impedance between the output of the converter switch 11 and the reference (ground or the like) which may draw sufficient current through the resistors 20 and 21 and the transistor 22 to turn it on. The diode 17 prevents such reverse current and allows the DC to DC converter 10 to turn off whenever the load is removed from the terminal 16.

Referring to FIG. 2, specific circuitry is illustrated in schematic form for all of the blocks illustrated in FIG.

1. The converter switch 11 includes three transistors 25, 26 and 27, which with their associated circuitry operate as a switch, a switch driver and a predriver, respectively. The variable width monostable and control circuit 12 includes a pair of transistors 28 and 29 which operate as the variable width monostable, a transistor 30 and associated circuitry which operates as a voltage clamp for the output of the monostable and a transistor 31 and associated circuitry which receives the pulses from the voltage clamp transistor 30 and supplies them to the predriver transistor 27. A transistor 35 and its associated circuitry operates as a voltage comparator and DC amplifier and supplies a signal to a transistor 36 and its associated circuitry which operates as a voltage control (pulse width control) for the monostable. A pair of transistors 37 and 38 and their associated circuitry are connected to the output of the converter switch 11 and operate as a current limit detector and current limit DC amplifier, respectively. The transistor 38 supplies a signal to a transistor 39 which, with its associated circuitry, operates similar to transistor 36. A transistor 45 and its associated circuitry operates as a clock to supply pulses to the monostable for periodic operation thereof. A transistor 46 and its associated circuitry operates as the DC voltage regulator 13 and upon receiving a signal from the transistor 22 supplies power to the clock transistor 45, the monostable transistors 28 and 29, the control transistors 36 and 39 and the voltage clamp and amplifier circuits 30 and 31. With the transistor 22 nonconducting no power is supplied by the transistor 46 to the variable width monostable and control circuit 12 and the swtich transistors 25, 26, and 27 are nonconducting.

Thus, an embodiment of the automatic turn-on circuit for a DC to DC down converter is illustrated and described, which automatic turn-on circuit operates to turn on the DC to DC down converter whenever a load is applied across the output thereof. Since the voltage divider means (resistors 20 and 21) and the switching means do not form a portion of the down converter, these circuits can be made sensitive to small amounts of load current while still providing the desired operation. Further, the automatic turn-on circuit requires a minimum amount of alterations in the down converter and can be applied to down converters already installed and in use. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In a DC to DC down converter having input and output terminals and a semiconductor switch coupled therebetween, which semiconductor switch is controlled by a variable pulse generator and adapted to be powered by a voltage source, an automatic turn-on circuit comprising:
   a. voltage divider means coupled between the input and output terminals of said converter, and having at least one tap, for conducting a relatively small current through said divider means from the input terminal to the output terminal, with a power supply connected to the input terminal, upon the connection of a load to the output terminal;
   b. switching means coupled to the tap of said divider means and operable in response to a voltage thereon, said switching means being further coupled between said pulse generator and said voltage source for supplying power from said voltage source to said pulse generator only during operation of said switching means; and
   c. unidirectional current conducting means connected in the circuit between said semiconductor switch and the coupling of said voltage divider means to said output terminal for allowing the flow of current from said semiconductor switch to said output terminal but no flow of current from said output terminal to said semiconductor switch.

2. An automatic turn-on circuit as claimed in claim 1 wherein the voltage divider means includes two resistors connected in series.

3. An automatic turn-on circuit as claimed in claim 1 wherein said switching means includes a transistor having a base connected to the tap of the voltage divider means.

4. An automatic turn-on circuit as claimed in claim 1 wherein the unidirectional current conducting means includes a semiconductor diode.

5. In a DC to DC down converter having input and output terminals and adapted to be powered by a voltage source, an automatic turn-on circuit comprising:
   a. voltage divider means coupled between the input and output terminals of said converter, and having at least one tap, for conducting a relatively small current through said divider means from the input terminal to the output terminal upon the connection of a load to the output terminal;
   b. switching means coupled to the tap of said divider means and operable in response to a voltage thereon for supplying power from said voltage source to said converter only during operation of said switching means; and
   c. unidirectional current conducting means connected in the circuit between said converter and the coupling of said voltage divider means to said output terminal for allowing the flow of current from said converter to said output terminal but no flow of current from said output terminal to said converter.

* * * * *